United States Patent [19]

Hughes et al.

[11] Patent Number: 5,223,550
[45] Date of Patent: Jun. 29, 1993

[54] FINE POLYBENZIMIDAZOLE-CONTAINING PARTICLES

[75] Inventors: O. Richard Hughes, Chatham; Dieter Kurschus, Bayville, both of N.J.

[73] Assignee: Hoechst Celanese Corp., Somerville, N.J.

[21] Appl. No.: 888,935

[22] Filed: May 26, 1992

Related U.S. Application Data

[63] Continuation-in-part of Ser. No. 810,611, Dec. 19, 1991, Pat. No. 5,147,895, and a continuation-in-part of Ser. No. 810,663, Dec. 19, 1991.

[51] Int. Cl.⁵ .................. C08J 9/228; C08J 9/232
[52] U.S. Cl. ........................... 521/134; 521/138; 521/184; 524/606; 524/607; 524/608; 525/435; 528/491
[58] Field of Search ............... 521/184, 134, 138; 524/606, 607, 608; 528/491; 525/435

[56] References Cited

U.S. PATENT DOCUMENTS

4,628,067 12/1986 Chen, Sr. et al. .............. 521/25

Primary Examiner—Morton Foelak
Attorney, Agent, or Firm—Michael W. Ferrell

[57] ABSTRACT

Fine, porous polybenzimidazole-containing particles prepared by spray-atomizing/quenching a polybenzimidazole-containing polymer solution into porous polybenzimidazole-containing particles, and fluidized bed, oppose jet milling the particles into fine, porous polybenzimidazole-containing particles. The milled particles exhibit a narrow particle size distribution centered at about a 5 μm mean particle size, a surface area of about 35 m²/g, and an open porosity of about 1.2 cm²/gm which is at pore radius of less than about 100 nm.

7 Claims, 5 Drawing Sheets

FINE POLYBENZIMIDAZOLE-CONTAINING PARTICLES

RELATED APPLICATIONS

This application is a continuation-in-part of copending applications Ser. No. 07/810,611, now U.S. Pat. No. 5,147,895, and Ser. No. 07/810,663, both of which were filed on Dec. 19, 1991.

FIELD OF THE INVENTION

The present invention is directed to fine polybenzimidazole-containing particles and a process for preparing these particles by spray-atomization/quenching of a polymeric dope to form the porous polybenzimidazole-containing particles followed by jet milling the particles to form fine, porous polybenzimidazole-containing particles.

BACKGROUND OF THE INVENTION

Polybenzimidazole is an non-melt processible polymer which exhibits high thermal stability as well as excellent resistance to solvent and oxidative degradation. This polymer possesses a very high melting temperature; when heated to high temperatures, it will usually decompose before melting. These characteristics have made polybenzimidazole desirable for use as a high temperature performance polymer.

Polybenzimidazole resin may be fabricated into a shaped article by the process described in U.S. Pat. No. 4,814,530 to Ward et al. Ward '530 describes a process of compacting a particulate, melt-derived polybenzimidazole resin in a mold under a pressure of 2,000 to 10,000 psi while heating the constrained resin to a temperature of 825° to 950° F. to form an article, and cooling the polybenzimidazole article while maintaining the pressure. Melt-derived polybenzimidazole particulates are produced by polymerizing an aromatic tetraamine and a diphenylester or an anhydride of an aromatic or heterocyclic dicarboxylic acid in a one or two stage process. This process of producing shaped articles has proven to be costly and inefficient for large scale production.

A more advantageous method of forming a polybenzimidazole-containing shaped article is by the process of cold compacting spray-atomization/quenched polybenzimidazole-containing particles. By this process, polybenzimidazole and other polymer resins may be processed alone or as blends by dissolving the resin(s) in a suitable solvent to form a dope, and atomizing the dope into a non-solvent atmosphere to form rounded particles which are cold compacted into a green body and sintered into a finished article. While spray-atomization/quenching produces particles exhibiting good density and compactability, particles size is often too large, and deficient in porosity for some applications.

Attempts have been made to reduce the size of melt-derived polybenzimidazole particles by ball and attrition milling, however, these methods have not produced particles exhibiting sufficiently high porosity and particles size reduction for some application. While spray-atomization/quenching particles exhibit a surface area, porosity and compactability greater than that of melt-derived particles, particle size is insufficiently low for many applications, i.e., plasma spraying deposition of thin polymer layers, mass transfer medium, injection molding into high density products, etc.

SUMMARY OF THE INVENTION

In accordance with the present invention there is described a process for preparing, fine, porous polybenzimidazole-containing polymer particles by the steps of preparing a polybenzimidazole-containing polymer solution; spray atomizing the polymer solution into an atomized non-solvent atmosphere to form porous polybenzimidazole-containing particles; and fluidized bed, oppose jet milling the porous particles utilizing a compressible fluid to form fine, porous polybenzimidazole-containing polymer particles. These particles are useful for the production of heterogeneous catalyst supports, mass transfer media, plasma spraying of thin polymer layers, high performance polymer articles, etc.

BRIEF DESCRIPTION OF THE DRAWINGS

While the specification concludes with claims particularly pointing out and distinctly claiming the present invention, it is believed that the present invention will be better understood from the following description in conjunction with the accompanying drawings in which:

DETAILED DESCRIPTION OF THE INVENTION

Polybenzimidazoles (PBI) useful in connection with this invention may comprise any polybenzimidazole resin known to those skilled in the art. Typical polymers of this class and their preparation are more fully described in U.S. Pat. No. 2,895,948; U.S. Pat. No. Re. 26,065, and in the *Encyclopedia of Polymer Science and Engineering*, Vol. 11, pages 573-577 (1988), which are herein incorporated by reference in their entirety. These polybenzimidazoles consist essentially of recurring units of the following Formulae I and II.

Formula I is:

wherein R is a tetravalent aromatic nucleus, preferably symmetrically substituted, with the nitrogen atoms forming the benzimidazole rings being paired upon adjacent carbon atoms, i.e., ortho carbon atoms of aromatic nucleus, and R' is selected from the group consisting of (1) an aromatic ring, (2) an alkylene group, and (3) a heterocyclic ring selected from the group consisting of (a) pyridine, (b) pyrazine, (c) furan, (d) quinoline, (e) thiophene, and (f) pyran.

Formula II is:

$$-C\underset{\underset{H}{N}}{\overset{N}{\diagup\diagdown}}Z-$$

wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of the recurring units of Formulae I and II, wherein R' is at least one aromatic ring of a heterocyclic ring.

Examples of polybenzimidazoles which have the recurring structure of Formula I are as follows:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6'-(m-phenylene)-diimidazobenzene;
poly-2,2'-cyclohexeneyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone;
poly-2,2'-(m-phenylene)-5,5'-di(benzimidazole) methane;
poly-2',2"-(m-phenylene)-5',5"-di(benzimidazole) propane2,2; and
poly-2',2"-(m-phenylene)-5,5"-di(benzimidazole) ethylene1,2;
wherein the double bonds of the ethylene groups are intact in the final polymer.

The preferred polybenzimidazole for use in the present invention is poly-2,2'-(m-phenylene)-5,5'-bibenzimidazole, the recurring unit of which is:

$$\left[\begin{array}{c}\text{structure}\end{array}\right]$$

Various methods may be used to prepare the polybenzimidazoles used, in the examples which follow. Representative techniques for preparing polybenzimidazoles are disclosed in U.S. Pat. Nos. 3,509,108; 3,549,603; and 3,551,389, which are herein incorporated by reference.

The present invention is directed to fine, porous polybenzimidazole-containing polymer particles prepared by the steps of forming a polybenzimidazole-containing polymer solution in a solvent; atomizing said polymer solution to form a first directed aerosol jet of droplets of said solution; simultaneously with said step of atomizing said solution into droplets, atomizing a non-solvent to form a second directed aerosol jet formed of droplets of said non-solvent, said first and second directed jets being coincident so that they cooperate to form an aerosol aggregation zone where the droplets of polymer solution associate with the non-solvent so as to aggregate; collecting the aggregated droplets such that sufficient non-solvent is present to precipitate the polymer from the solvent into highly porous particles; and milling the particles in a fluidized bed, opposed jet mill to form fine, porous polybenzimidazole-containing particles.

The first step of the process is to form a solution or dope of polymeric resin dissolved in a suitable solvent. The polymeric solution utilized herein generally contains about 5 to about 25 percent by weight of polymer solids, based on the total weight of the solution. Typically, however, the resin will contain about 8 to about 18 percent by weight of solids and preferably, about 12 percent by weight of polymer solids. The polybenzimidazole-containing polymer solution may contain neat polybenzimidazole (i.e., 100 wt % PBI). However, it is typical for the solution to contain from about 20 to about 100 weight percent of polybenzimidazole and from about 0 to about 80 weight percent of a second polymer, based on the total weight of the solution.

The second polymer may be selected from a polymer that is mutually soluble and miscible in a solvent in which polybenzimidazole is soluble. However, these polymers may be dissolved separately from polybenzimidazole, and prepared into fine, porous particles by the process of this invention. These polymers are generally selected from polybenzimidazolones, polybenzoxazoles, polybenzthiozoles, polyesters, polyimides, polyetherimides, polyamides, polyamideimides, partial and wholly aromatic aramides, as well as nylons of hexamethylene diamine and terephthalic acid, polyarylketones, polyarylsulfides, etc., and mixtures thereof.

The solvents utilized to form the polymer solution or dope include those solvents which are commonly recognized as being capable of dissolving the particular polymeric resin being used. Illustrative examples of suitable solvents include N,N'-dimethylacetamide, N,N'-dimethylformamide, dimethylsulfoxide, and N-methyl-2-pyrrolidone. Additional representative solvents include methanesulfonic acid, polyphosphoric acid, formic acid, acetic acid, and sulfuric acid. Particularly, the preferred solvent is N,N'-dimethylacetamide (DMAc) having a concentration of from about 90 to 100 percent and preferably about 99 percent by weight.

Methods of dissolving different polymers in a variety of solvent are known to those skilled in the art. One suitable method for dissolving polybenzimidazoles is by mixing the materials at a temperature above the normal boiling point of the solvent, for example, about 25° to about 120° C. above the boiling point, and at a pressure of about 2 to about 15 atmospheres for a period of about 1 to about 5 hours. Preferred conditions will usually comprise heating the mixture in a stainless steel reactor at a pressure of about 7 atmospheres for about 2 hours at a temperature of about 235° C. The resulting solution is then preferably filtered to remove any undissolved polymer. A minor amount of lithium chloride, e.g., about 2 percent by weight, optionally, may be added to the solution in order to prevent the polymer from phasing out of the solution upon standing for extended periods of time.

The non-solvent component for the present invention is any substance which can be atomized or formed into an aerosol in which the polymer to be processed is insoluble. Generally, the non-solvents include water and $C_1$ to $C_4$ aliphatic alcohols. However, any component that is insoluble with the polymer is sufficient. Typically, the non-solvent component is water.

Figure 1:
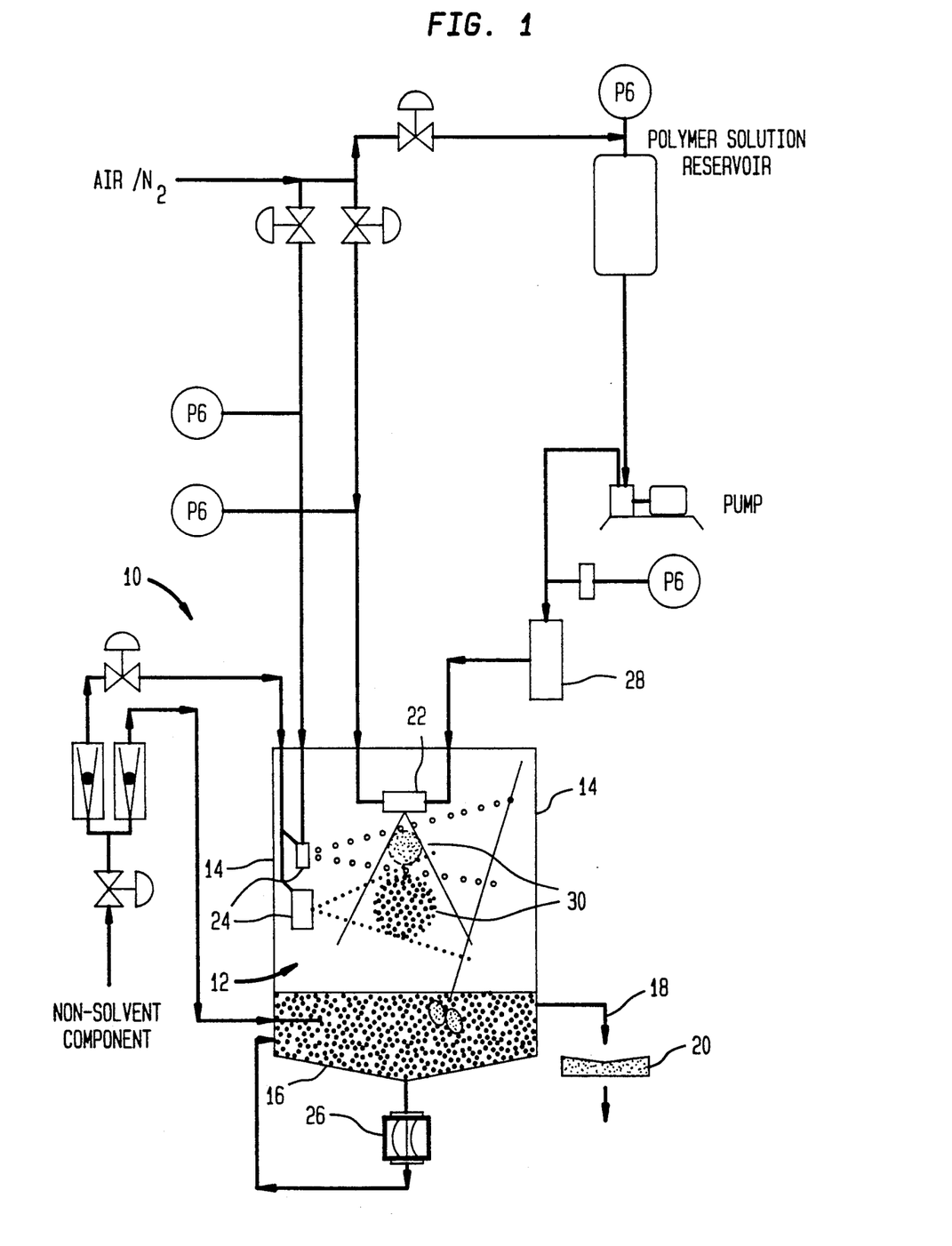
FIG. 1 is a cross-sectional schematic view in elevation of an atomization reactor utilized to form polybenzimidazole-containing practices.

An atomization reactor system, as illustrated in FIG. 1, is utilized to form the highly porous particles of the invention. The reactor system (10) has a cylindrical vessel (12) with upstanding side walls (14) and a cone-shaped bottom (16) with an outlet (18) equipped with a particle separation system (20). Typical reactor dimensions are about 36 inches in diameter by about 37 inches in height. A plurality of nozzles are contained within the reactor. The first set of nozzles (22), slidably attached to the top-center of the reactor, are utilized to atomize the resin solution downwardly into the reactor. A second set of nozzles (24), equaling about four times the quanity of the first nozzle set, separated into an equal number of rows (i.e., four), equally spaced and attached to the reactor side walls at positions well below the first nozzle set, are utilized to atomize the non-solvent component in a direction perpendicular to that of the resin solution and horizontally into the reactor to create an aggregation zone. A recirculation pump (26) is positioned in the bottom of the reactor to maintain suspension of the rounded particles in the non-solvent solution prior to discharging through outlet (18).

The atomization nozzles, manufactured by Spraying Systems of Wheaton, Ill., produce a wide-angle rounded spray pattern using a No. 1 spray set-up containing Fluid Cap 2050 and Air Cap 64. Under normal operation at 60 psi the nozzles are capable of delivering 0.79 gallons of liquid per hour at a spray angle of about 18 degrees. The polymer solution is pumped from a reservoir through a filtering system (28) to remove undissolved resin before feeding it through the first inlet of nozzles (22). To aid atomization, a gas such as air or nitrogen is fed into a second inlet of the nozzles (22) as is typical of gas-operated atomization nozzles. These nozzles (22) are suspended along the upper-vertical axis of the reactor in such a way as to spray fine droplets of the resin solution down into the reactor. The non-solvent component (e.g., water or alcohol) is fed into a first inlet of each of the second set of nozzles (24) while a compressed gas such as air or nitrogen is fed into a second inlet of each second nozzle (24) to aid in atomization. When the non-solvent component is water, from about 1 to about 2 weight percent DMAc is sometimes added to dilute the solvent. If the solvent is not adequately diluted the precipitated particles will often remain soft and may agglomerate.

During operation of the reactor, the polymer solution aerosol jet is discharged from the first set of nozzles (22) downwardly into the atomized atmosphere of the non-solvent component, which is discharging horizontally into the agglomeration (i.e. reaction) zone (30) in the form of an aerosol jet from the second set of nozzles (24) to form highly porous particles. An initial quantity of non-solvent component, e.g. water, is accumulated in the reactor bottom to maintain suspension of the highly porous particles as they are formed, as well as to complete any residual precipitation from solution that may be necessary. Typically, the reactor is operated at atmospheric pressure, but other pressures are possible. The contents in the bottom of the reactor (i.e., polymeric particles suspended in the non-solvent component) are constantly recirculated to aid in suspension of the particles before discharging through outlet (18). To separate the suspended particles from the solvent/non-solvent solution, the outlet of the reactor is typically equipped with a separation system (20). The separation system can comprise any of several methods known in the art including vacuum filtration or centrifugation. For example, the particles may be collected on the filter and washed to remove residual solvent and non-solvent components, or the slurry may be centrifuged to produce a wet cake which may be washed and dried. The wet cake that results after filtration or centrifugation must be dried to a controlled or defined moisture content that assures adequate cold compatibility. One of several approaches may be adopted: 1 wet cake powder may be dried to lower non-solvent content ($<7$ wt %) and humidified to the desired moisture content (7–12 wt %); or 2 the wet cake particles may be dried directly to the desired moisture content (when the non-solvent is water). Thereafter, the dried, free-flowing highly porous particles can be milled and screened if so desired to produce submicron, porous particles.

There are several ways to attempt to control the size of the highly porous particles. For instance, size may be controlled by adjusting the weight percent of resin in the solvent solution, adjusting the distance between the first set of nozzles (22) and the set of second nozzles (24), i.e., a greater distance between the two sets of nozzles will yield smaller particles, and adjusting the amount of non-solvent component droplets in the atmosphere. Moreover, the particle size may be changed by adjusting pressure on the nozzles, especially the polymer solution nozzles (22).

The fine, porous polybenzimidazole particles prepared according to the process the process of the present invention exhibit a narrow particle size distribution of from about 1 to about 10 $\mu$m (centered at a 5 $\mu$m mean particle size); a surface area of from about 30 to about 40 m$^2$/gm; and an open porosity ranging from about 1.0 to about 1.5 cm$^3$/gm which is largely centered at pore radii of less than about 100 nm.

To further reduce the particle size, polybenzimidazole-containing particles prepared by the spray atomization/quenching process described hereinbefore are jet milled to produce submicron size particles. This process is typically carried out in a fluidized bed, opposed jet mill. The fluidized bed, opposed jet mill utilized to produce the submicron particles of the present invention is manufactured by Alpine American Corporation under the name Fluidized Bed Opposed Jet Mill 100 AFG ™.

Figure 2:
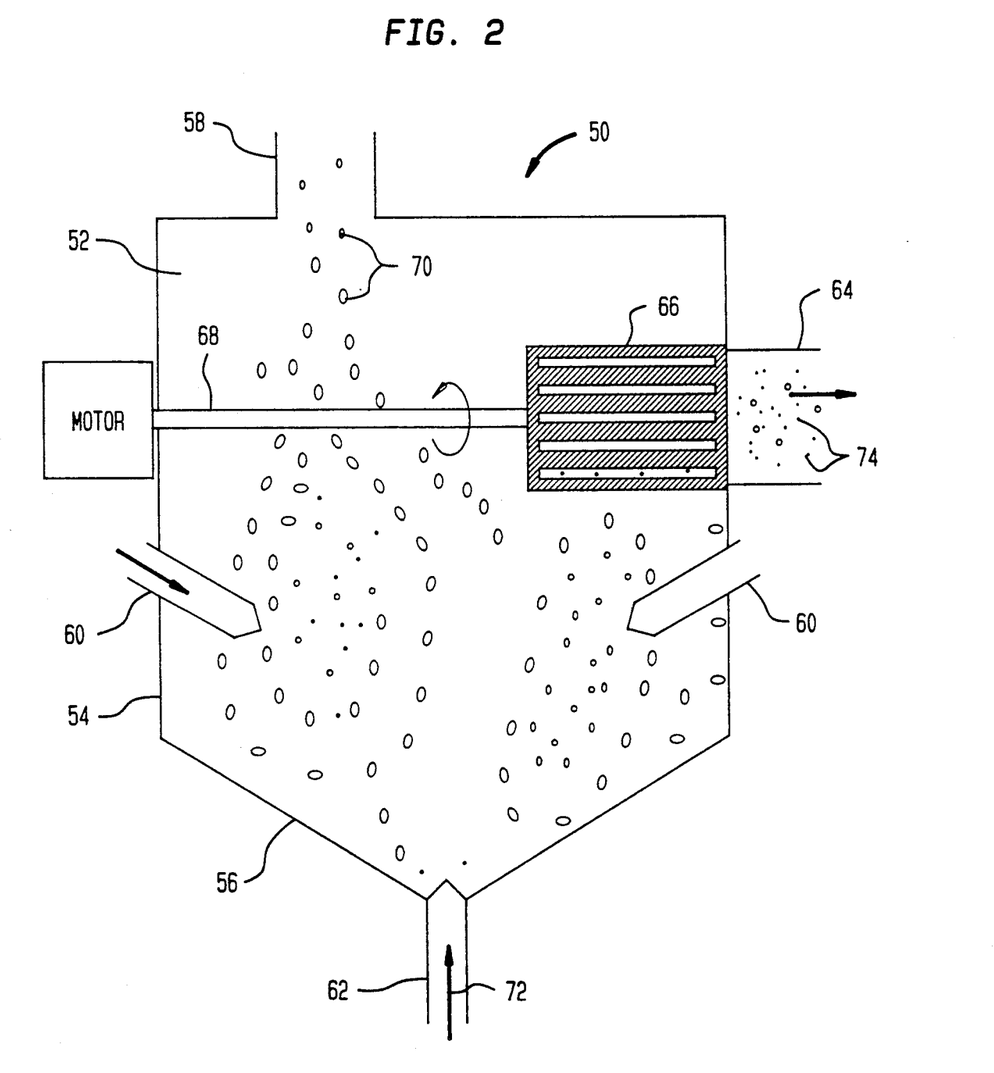
FIG. 2 is a cross-sectional schematic view in elevation of a fluidized bed, opposed jet mill utilized to reduce particle size of polybenzimidazole-containing particles.

A fluidized bed, opposed jet mill, as utilized in the present invention, is illustrated in cross-sectional view in FIG. 2. The fluidized bed, jet mill (50) is constructed of a cylindrical vessel (52) with upstanding side walls (54) and a cone-shaped bottom (56). The vessel (52) is generally constructed of stainless steel or similar rigid material, and has dimensions of about 12 inches in height and about 8 inches in diameter. An influent port (58) is located in the central upper portion of the vessel (52). A plurality of grinding nozzles (60) having an inside diameter of about 0.08 inches are located in the lower portion of the upstanding side walls (54), and aimed downward at about a 45° angle towards the cone-shaped bottom (56). At least one grinding nozzle (62) is located in the center of the cone-shaped bottom (56) and aimed upward into the vessel (52). An effluent port (64) is located in the upper portion of the side wall (54). A classifier (66) is rotatingly connected to a shaft and motor (68), and located over effluent port (64).

During operation of the mill, large particles (70) are fed into the mill (50) through influent port (58) at a rate ranging from about 0.3 to about 0.4 pounds per hour and may be accelerated by means of high velocity propellant jets of fluid (72) emitted from grinding nozzles (60 and 62) to sonic or supersonic speeds, i.e., 500 to 1200 m/s. The fluid is generally air or an inert gas having a pressure of up to about 10 bars. Fluid acceleration causes interparticle collision and impact of the particles with the inner walls of the vessel (52) wherein larger particles (70) are reduced in size to smaller particles (74). The fluid acceleration causes the smaller particles (71) to travel up into the classifier (66). The classifier (66) is constructed of a cylindrical disk having horizontial openings (67), equally spaced thereabout. Generally, the classifier rotates at speeds ranging from about 2,000 to about 20,000 rpm. At higher revolutions, only smaller particles (72) are allowed to pass through the classifier openings (67) which travel to the effluent port (64); larger particles (70) are rejected by the classifier, and remain in the vessel (52) where they are further reduced in size by interparticle collision. Typically, the effluent, smaller particles (71) are transferred via the effluent port (64) to a cyclone for further separation, collection, cleaning and recovery.

The following examples are general illustrations of preparing fine, porous particles. They are not intended in any way to limit the scope of the invention described herein, but are provided merely by way of illustration.

EXAMPLE I

PBI resin was dissolved into DMAc to make a 12 weight percent PBI solution. After purging 75,700 gm of water with $N_2$ for several days, 1528 gm of DMAc (about 2 wt %) were added thereto. The water was fed at a rate of 600 $cm^3$/min and 40 psi into the second set of non-solvent nozzles along with nitrogen at 10 psi. After an initial quanity of water covered the bottom of the reactor, the PBI solution was fed at a rate of 24.8 $cm^3$/min and a pressure of 58 psi with nitrogen assistance at 40 psi into the first set of nozzles. Upon contact of the PBI solution and non-solvent, highly porous PBI particles were formed. These particles were collected from the bottom of the reactor, screened, filtered, washed in methanol and hexane, dried in Ross mixer for 70 hours at 200° C., and analyzed for particle size; the results appear in Table 1, below:

TABLE 1

| SIEVE ANALYSIS | |
|---|---|
| Sieve, μm | Fraction, wt. % |
| >600 | 1.28 |
| 600–300 | 1.60 |
| 300–150 | 6.01 |
| 150–74 | 37.61 |
| 74–53 | 21.92 |
| 53–37 | 15.53 |
| <37 - fines | 16.06 |

Thereafter particles were divided into fractions greater than (>) and less than (<) 37 μm for analyses.
Particle size: >37 μm
BET Surface Area: 36 $m^2$/gm
ASTM B 329 Apparent Density: 0.122 gm/$cm^3$ Particle size: <37 μm
BET Surface Area: 18 $m^2$/gm

EXAMPLE II

Following the procedure of Example I, a 50/50 weight ratio of PBI/Isaryl 25H (an aromatic polyester manufactured by Isonova Technische Innovationen G.m.b.H. of Austria) resin powders were dissolved in DMAc to form a solution containing 12 weight percent polymer solids. A 4.4 kg sample of solution was spray atomized at a rate of 12.4 $cm^3$/min and a pressure of about 30 psi with the assistance of $N_2$ gas at a pressure of about 15 psi. The non-solvent quenching fluid, water, was fed to the nozzle at a rate of about 1080 $cm^3$/min and a pressure of about 25 psi. The spray atomized solution contacted the spray atomized/quenching non-solvent, i.e., water, to form polymer particles which were filtered, washed and dried. These particles were dried, mositurized at 80° C./55% RH for 24 hours and jet milled in an apparatus similar to that in FIG. 2.

EXAMPLE III

PBI particles produced by spray atomization/quenching operation similar to Example I were milled in an apparatus similar to that in FIG. 2. Nitrogen gas was fed to the nozzles at a pressure of 6 atm and a velocity of about 600 m/s into the milling vessel. The classifier was operated at a speed of 5,000 rpm, and a batch quantity of 2 lbs. of PBI particles with a moisture content of 3.5 wt % at 78° F. were feed into the mill at a rate of 0.36 lbs/hr. The before and after milling particle characteristics are given in Table 2, below:

TABLE 2

| | Before Milling | After Milling |
|---|---|---|
| Milling Rate, lbs/hr | N/A | 0.36 |
| Surface Area, $m^2$/gm | 60 | 35 |
| Porosity, $cm^3$/gm | 1.0 | 1.2 |
| Morphology † | rounded | rounded, some agglomeration |
| Particle Size | $D_{10}$ · 8 μm | $D_{10}$ · 1 μm |
| Distribution | $D_{50}$ · 34 μm | $D_{50}$ · 5 μm |
| | $D_{97}$ · 82 μm | $D_{97}$ · 9 μm |

† determined by electron microscopy image

The jet milled particles appear to be microporous when anaylzed by Hg porosimetery, exhibiting a total porosity of about 1.2 $cm^3$/gm. The dry particles sorbs about 1.4 $cm^3$/gm of water to the point of incipient wetness. Most of the porosity occurs in small radius pores (<100 nm). However, atomized PBI particles do not possess much porosity at these small radii which may suggest that the porosity is generated by the jet milling process. The after-milled particles have a narrow particle size distribution, centered at about a 5 μm mean particle size ($D_{50}$·5 μm), while the before-milled particle size destribution is centered at about 34 μm ($D_{50}$·34 μm).

The porosity of the milled PBI particles is unique and especially interesting because it is realtively large and present in pores with radii that can be readily intruded by liquids, e.g., water. The porosity as a percent of the volume of a powder particle is about 36% (dense PBI has a specific volume of 0.77 $cm^3$/gm whereas milled PBI has a specific volume of 1.2 $cm^3$/gm).

Figure 3:
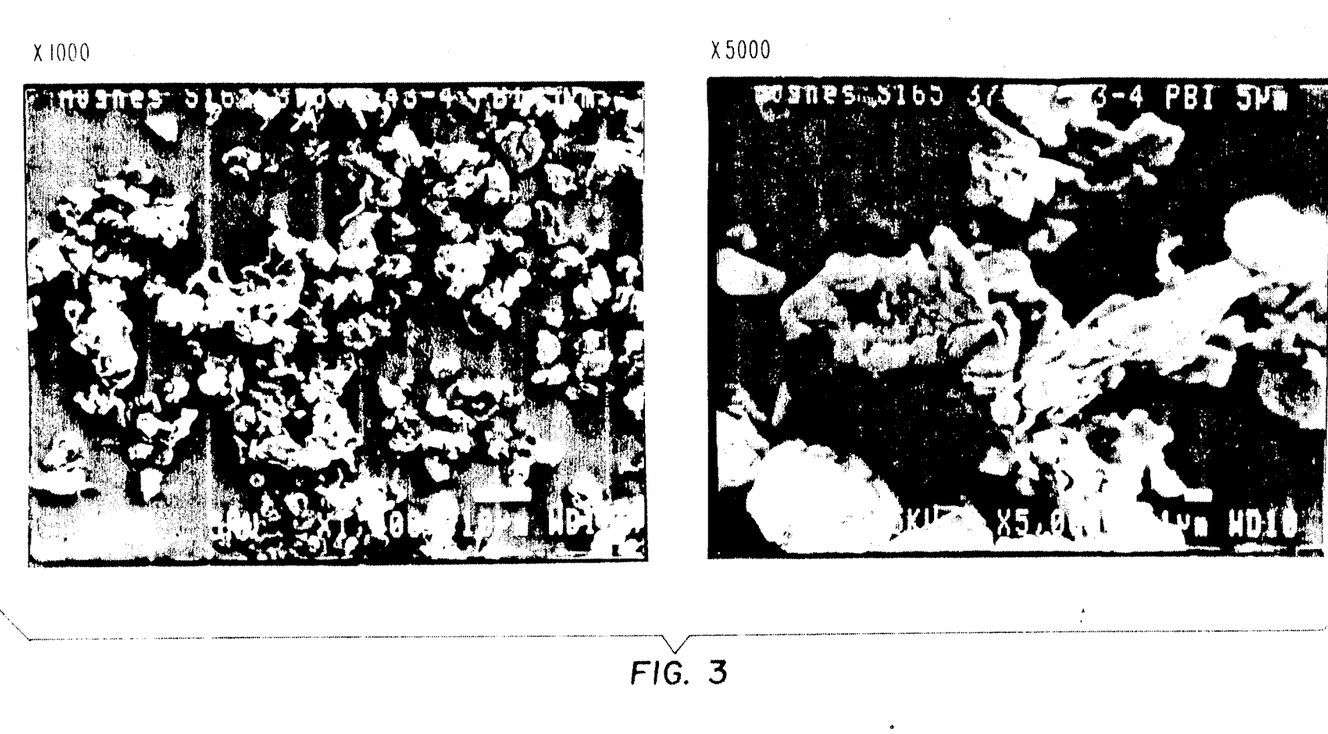
FIG. 3(a) is an electron microscope photograph magnified 1000 times of polybenzimidazole particles prepared by milling in a fluidized bed, opposed jet mill.
FIG. 3(b) is an electron microscope photograph magnified 5000 times of polybenzimidazole particles prepared by milling in a fluidized bed, opposed jet mill.

FIG. 3(a) is an electron microscopy photograph of PBI particles prepared by spray atomization/quenching followed by fluidized bed, opposed jet milling which are magnified one thousand times. The photograph illustrates the rounded morphology and typical size of the PBI particles prepared by the process of this invention.

FIG. 3(b) is an electron microscopy photograph of PBI particles prepared by spray atomization/quenching followed by fluidized bed, opposed jet milling which are magnified five thousand times. The photograph further illustrates the rounded morphology and porosity of the PBI particles prepared by the process of this invention.

Figure 4:
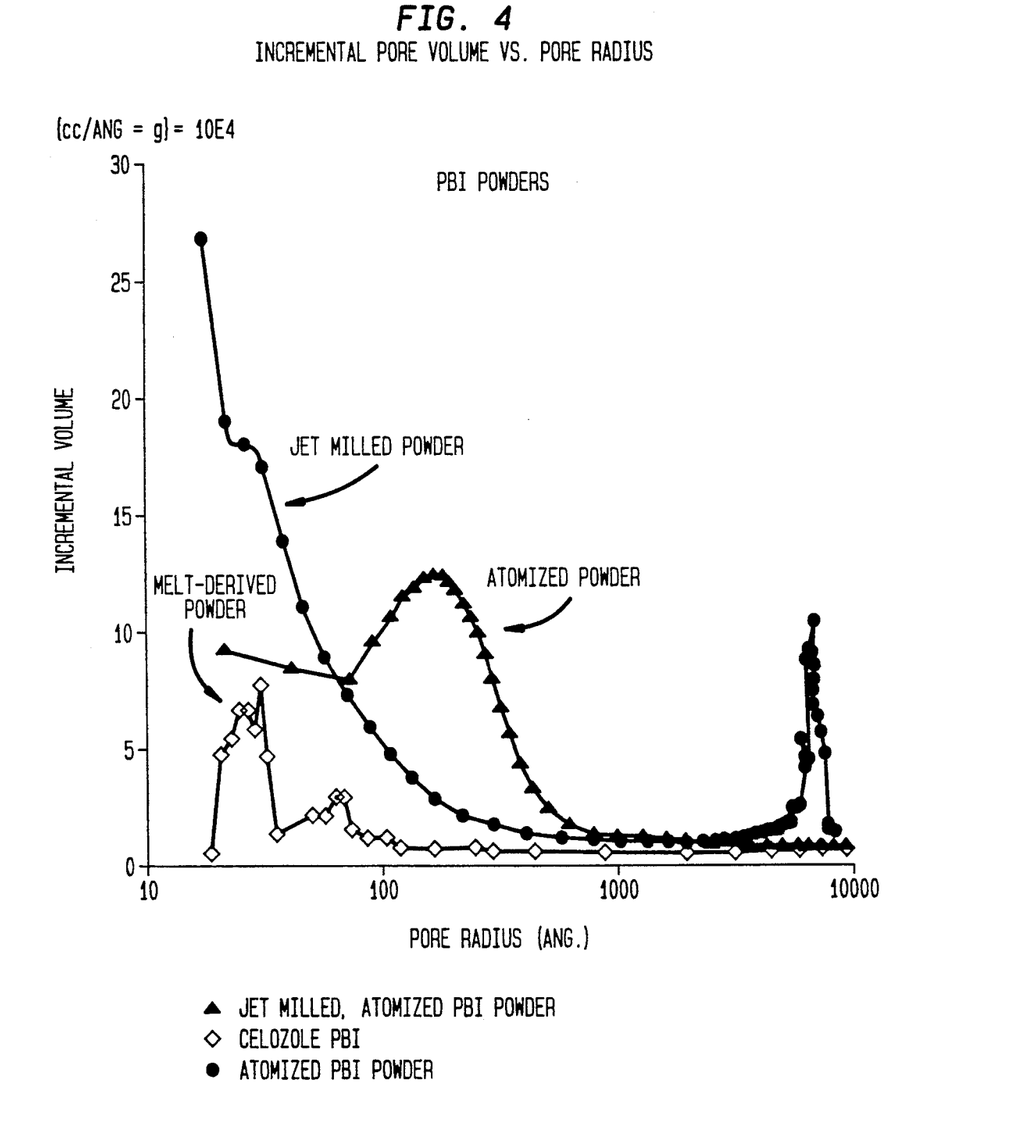
FIG. 4 is a graphical illustration of pore radius versus incremental pore volume for melt-derived, atomized and jet milled polybenzimidazole particles.

FIG. 4 is a plot of pore radius versus incremental volume of PBI particles of a melt-derived, spray atomized and spray atomized-milled PBI powders. The total pore volume, measured by mercury intrusion analysis, of the 100 mesh PBI melt-derived powder is typically about 0.02134 cm$^3$/gm at a mean diameter of about 50 to about 150 μm. The total pore volume of spray atomized PBI powder is about 30 to about 60 cm$^3$/gm at a mean diameter of about 30 to about 60 μm. The total pore, measured by mercury intrusion, of volume of spray atomized, jet milled, PBI powder prepared by the process of the invention is typically about 1.21 cm$^3$/gm at a mean diameter of about 5 μm.

The fine, porous particles of the invention may be compacted into green bodies and sintered into useful near net shapes. Some thought has been given to the compaction behavior of polymeric particulates in "Compaction of Polymer Powders" by G. W. Halldin et al. SPE, 39th ANTEC, Boston, Mass., May 4-7, 1981, pages 353-355. Halldin studied the density of green bodies as a function of compaction pressure, and among other things, concluded that the green strength of a green body is determined by the green density. There is an upper limitation of compaction pressure wherein increasing the pressure will not increase the relative green density of the green body, i.e. plateau density. Since the green strength for any green body is determined by the green density, there will be a maximum green strength which corresponds to the plateau green density level; higher strength is not be possible at higher compaction pressures.

Halldin concluded that the compressibility of polymer powders can be best modeled by the equation:

$$\rho^* = \rho^*_p - (\rho^*_p - \rho^*_a)\exp(-kP)$$

wherein $\rho^* = \rho_g/\rho_t$, $\rho_g$=green density, gm/cm$^3$, and $\rho_t$=theoretical density, gm/cm$^3$; $\rho^*_p$=relative plateau density; $\rho^*_a$=relative apparent density; k=compaction constant; and P=compaction pressure, MPa. According to the equation, as the compaction constant of a green body, k, approaches a value of 1.0, less compaction pressure, P, is required to produce a green body having a green density, $\rho_g$, which approaches its theoretical density, $\rho_t$. However, as the value of k decreases, more compaction pressure is required to produce a green body having a density which approaches the theoretical density.

Figure 5:
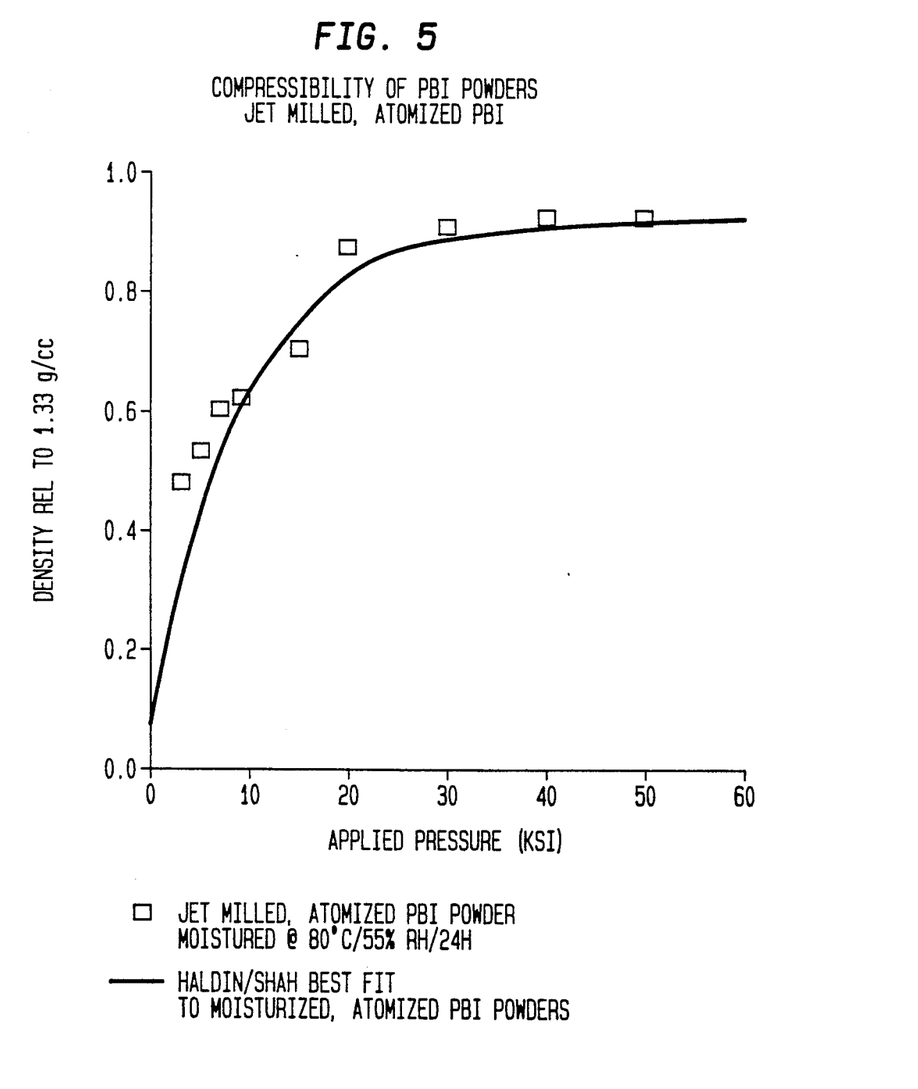
FIG. 5 is a compressibility curve of atomized, jet milled polybenzimidazole particles.

FIG. 5 represents a compressibility curve of jet milled, atomized PBI powder prepared by the process of the invention which was compressed into disk; the powder was moisturized at 80° C. and 55% relative humidity for 24 hours. The theoretical density of the powder, as measured by He pycnometry, was 1.33 gm/cm$^3$, the relative apparent density was 0.090 gm/cm$^3$, and the relative plateau density was 0.923 gm/cm$^3$. The data points of the curve represent the relative densities of disks made at various applied pressures based upon the theoretical density. The compaction constant, k, calculated according to a best fit curve of the Halldin equation was about 0.11 ksi$^{-1}$ for PBI powder containing about 14 wt % moisture made by the jet milling, atomization process described herein. Unless otherwise indicated apparent density is measured according to ASTM No. D-1895-89, and porosity is measured by mercury porosimetry.

The PBI-containing particles prepared by spray atomization/quenching of the invention may be cold compressed into shaped articles at ambient temperatures and sintered into near net finished articles which require little if any finishing before final use. Other PBI particles do not possess this unique cold compression characteristic. The particles may be utilized for plasma spray deposition of thin PBI layers, for small molecule adsorption, as substrates for copper adsorption of detoxification agents in chemical defense textiles, as a heterogenous catalyst support, as a filler to improve the brittle fracture resistance of polymers, and among other things, as a component of heavily loaded slurries for slip and pressure casting.

We claim:

1. Fine, porous polybenzimidazole-containing polymer particles prepared by the process comprising the steps of preparing a polybenzimidazole-containing polymer solution; spray atomizing the polymer solution into an atomized non-solvent atmosphere to form porous polybenzimidazole-containing particles on the fluidized bed, oppose jet milling the porous particles utilizing a compressible fluid to form fine, porous polybenzimidazole-containing polymer particles, wherein the polybenzimidazole-containing polymer comprises a second polymer selected from the group consisting of polybenzimidazolones, polybenzoxazoles, polybenzthiozoles, polyesters, polyimides, poly(ether-imides), polyamides, poly(amide-imides), partial and wholly aromatic aramides, nylons of hexamethylene diamine and terephthalic acid, polyarylketones and polyarylsulfides.

2. The particles according to claim 1 wherein the polybenzimidazole-containing polymer solution contains from about 20 to about 100 weight percent of polybenzimidazole and from about 0 to about 80 weight percent of a second polymer.

3. The particles according to claim 2 wherein the polymer solution contains from about 5 to about 25 weight percent of polymer solids.

4. The particle according to claim 3 wherein the solvent is selected from the group consisting of N,N'-dimethylacetamide, N,N'-dimethylformamide, dimethylsulfoxide, methanesulfonic acid, N-methyl-2-pyrrolidone and polyphosphoric acid.

5. The particle according to claim 4 wherein the non-solvent is selected from the group consisting of water, a $C_1$ to $C_4$ aliphatic alcohol and mixtures thereof.

6. The particle according to claim 1 wherein the milling rate ranges from about 0.30 to about 0.40 lbs/hour.

7. A shaped article produced from the particles according to claim 1.

* * * * *